Feb. 15, 1955

B. F. ARPS 2,702,211

DETACHABLE HALF TRACK TRACTOR ATTACHMENT

Filed Feb. 28, 1951

INVENTOR.
BRUNO F. ARPS
BY A.S.Kooh
ATTORNEY

Feb. 15, 1955   B. F. ARPS   2,702,211
DETACHABLE HALF TRACK TRACTOR ATTACHMENT
Filed Feb. 28, 1951   3 Sheets-Sheet 2

INVENTOR.
BRUNO F. ARPS
BY A.S. Krob
ATTORNEY

Feb. 15, 1955  B. F. ARPS  2,702,211
DETACHABLE HALF TRACK TRACTOR ATTACHMENT
Filed Feb. 28, 1951  3 Sheets-Sheet 3
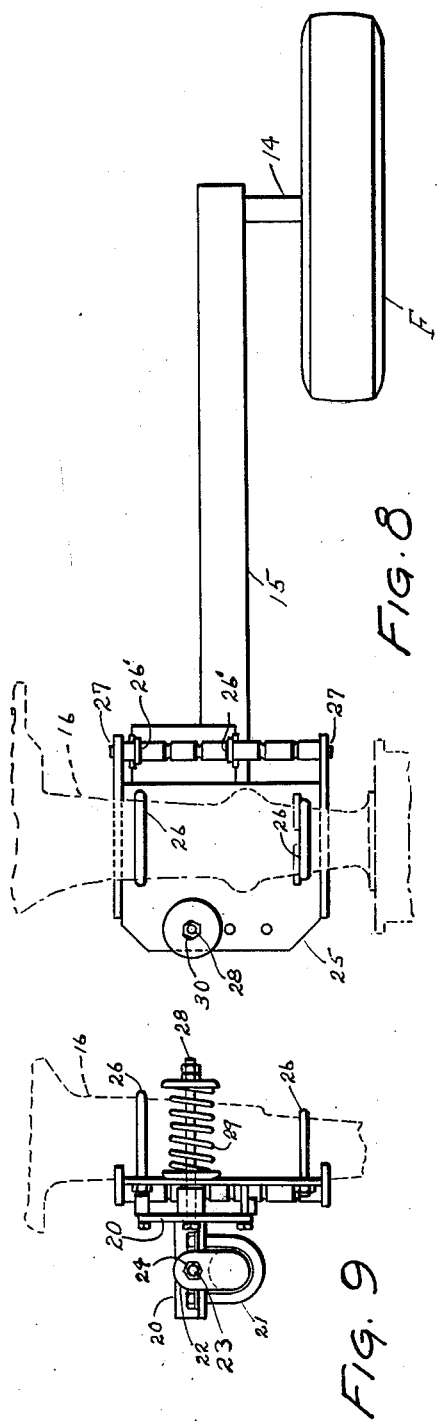
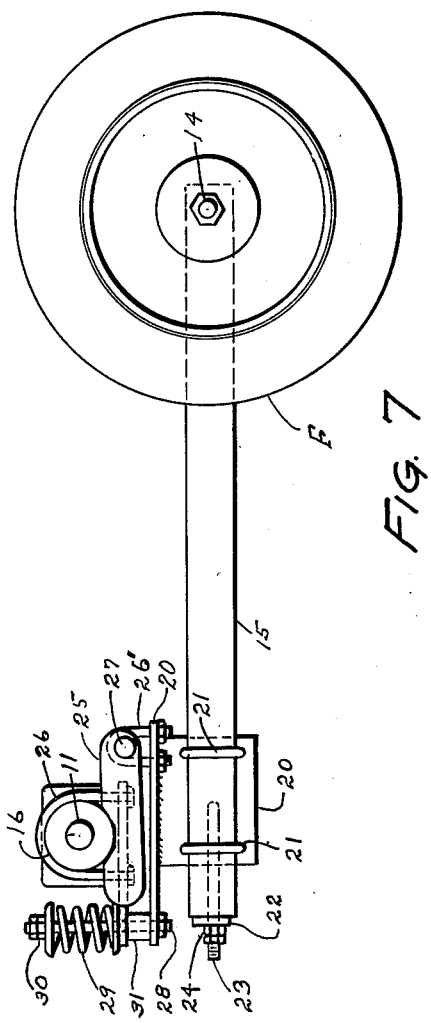
INVENTOR.
BRUNO F. ARPS
BY *A.S.Knoll*
ATTORNEY

United States Patent Office 2,702,211
Patented Feb. 15, 1955

2,702,211

DETACHABLE HALF TRACK TRACTOR ATTACHMENT

Bruno F. Arps, New Holstein, Wis., assignor to Arps Corporation, New Holstein, Wis.

Application February 28, 1951, Serial No. 213,075

1 Claim. (Cl. 305—8)

There are many farm tractors in use, especially of a size suitable for two or three bottom gang plows. These tractors generally have rear driving and forward guiding wheels.

Generally such tractors have plenty of power but at times they lack traction. Many endless track type tractors are sold and in use particularly for unfavorable soil conditions. The conventional rear wheel drive tractors of the size mentioned are generally very satisfactory. there are, however, times when such tractors are practically inoperative because the driving wheels slip excessively.

In order to meet these infrequent and unusual situations with a conventional tractor, there has developed a demand for a half track attachment which is inexpensive, easily attached and detached, thus making it possible to meet these unusual situations economically, and somewhat similar to the operating characteristics of an endless track tractor.

The present invention meets all the requirements in the foregoing statements. That is, the present invention is simple, easily manufactured at low costs, easily attached and detached, and is efficient, particularly because it does not require a change in the tractor, so that it may be said that it is a very desirable attachment suitable for temporary or permanent use.

A particular object of the present invention is to provide novel strips or cleats for the track, which are adapted to ride on the tread of the rubber tires of the driving wheels of a conventional tractor and on the tread of supplemental wheels positioned preferably intermediate the guiding and driving wheels of the tractor.

An important object of the present invention is to provide the strips or cleats with pairs of narrow spaced apart brackets having open end hooks which are hingedly connected together by rectangular links, so as to form endless track chains having suitable means for engaging the rubber tire treads and for efficiently engaging the soil under favorable and unfavorable conditions.

An important object of the present invention is to provide strips or cleats and connecting links which may if desired, be shipped disassembled and be easily assembled at the most convenient time, and having means for conveniently locking the links to the strips without the use of bolts or special tools of any kind, and with means whereby the connection between strips may be easily severed when necessary.

A further object of the present invention is to provide relatively small in diameter rubber tired supplemental wheels for carrying the front end of the endless tracks, and having means whereby the position of these supplemental wheels may be adjusted so as not to seriously interfere with guiding the tractor, but having holding down springs so these wheels may raise against the tension of the springs for passing over rises in the ground and without lifting the guiding wheels from the ground.

To these and other useful ends, my invention consists of parts, combinations of parts or their equivalents and mode of operation as hereinafter described and claimed and shown in the accompanying drawings in which:

Figs. 7, 8 and 9 are side, top and rear views of the mounting means for the supplemental wheels.

Figure 1:
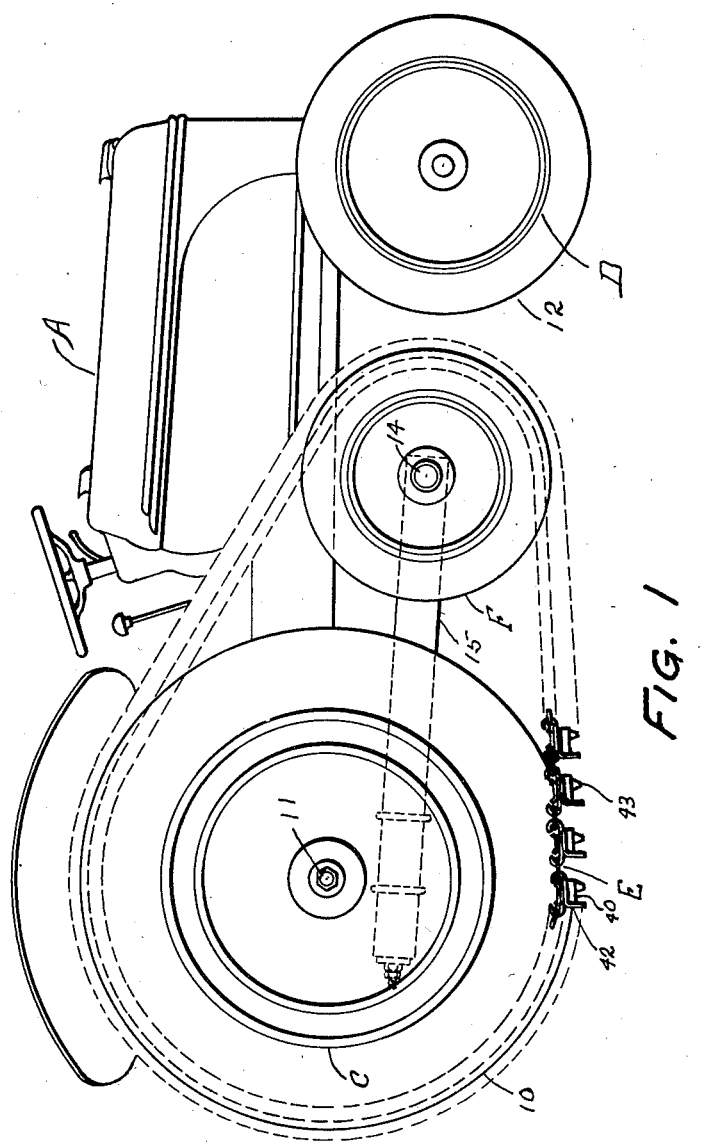
Fig. 1 is a side elevational view of a conventional tractor having mounted thereon my novel half track attachment, a part only of the individual strips and links being shown in detail. The remainder of the track being shown by dotted, curved and straight lines.
Figure 2:
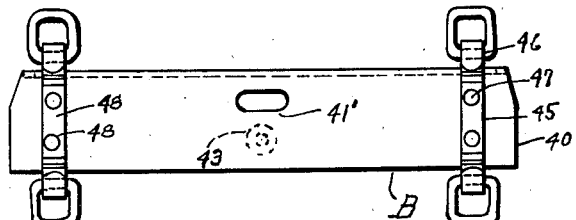
Fig. 2 is a view of my improved strips, showing the side which rides on the tread of the tires.
Figure 3:
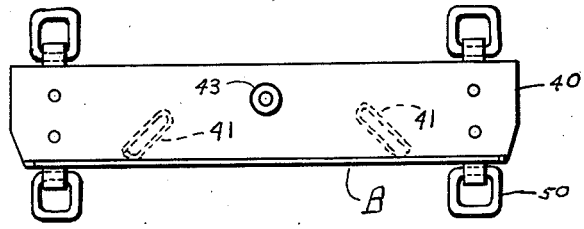
Fig. 3 is a view of the other side of the strip illustrating the side that contacts the ground.
Figure 4:
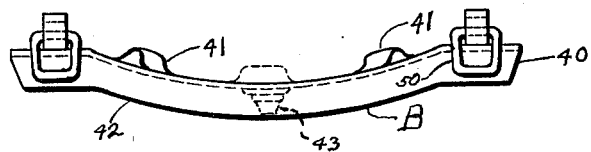
Fig. 4 is a front view of the strip shown in Figures 2 and 3.
Figure 6:
Fig. 6 is an enlarged flat side view of the connecting links shown in Figures 1, 2–5.

As thus illustrated the tractor is designated in its entirety by reference character A. The strips or cleats in their entireties are designated by reference character B. The driving wheels of the tractor are designated in their entireties by reference character C. The guiding wheels are designated in their entireties by reference character D. The half tracks or endless chain assemblies are designated in their entireties by reference character E. Reference character F designates the supplemental wheels in their entireties.

A very important feature of applicant's design is the mounting of the supplemental wheels to the rear axle housing, whereby these wheels operate independently; are mounted on the rear axle housing with means for fixing their lowest position; for yieldingly holding them downward in their lowest position and for various necessary adjustment of these wheels.

Tractor A may be of any conventional design. Wheels C are preferably equipped with rubber tires 10, and are mounted on axle 11 and guiding wheels D are equipped with rubber tires 12 and are positioned as shown in Figure 1. Wheels F are mounted on spindles 14 which are rigidly secured to arms 15. These arms are mounted on the rear axle housings 16 as follows:

Arms 15 are secured to a bracket 20 by means of U bolts 21—21, their rear ends having secured thereto a projection 22. A bolt 23 is secured to bracket 20 and freely extends through extension 22, having lock nuts 24: thus by loosening U bolts 21, nuts 24 may be used for moving arms 15 for adjusting the tautness of chain E.

A bracket 25 is secured to axle housing 16 by means of U bolts 26—26 and bracket 20 is pivoted to bracket 25 as at 27, thus spindle 14 can move vertically on pivot 27 as an axis. A bolt 28 extends through openings in the rear ends of brackets 25 and 20, a spring 29 is mounted on bolts 28 and between holding nuts 30 and bracket 25, thus spindle 14 will be urged downwardly by the springs. A sleeve 31 is positioned on bolt 28 and between brackets 25 and 20, thus to limit the downward movement of spindle 14, and hold wheel F in the position shown in Figure 1, the tread of which is held somewhat higher than the tread of wheels C and D, so as not to seriously interfere with the steering of the tractor, but permit wheel F to ride over relatively high projections on the ground, thus to prevent removing too much weight from the steering wheels D.

It will be seen that the mechanism connecting wheels F may be easily removed from the housings; that after chain track E has been placed in position on the wheels, members 15 may be adjusted forward for the desired tautness of the chain by nuts 24, and that the lowest position of wheels F may be optionally determined by changing the length of sleeve 31.

It will be seen that wheels F are permitted to ride over the ground independent of each other, and that members 15 may be conveniently moved rearward when necessary for removing chain E, and can be easily readjusted for proper tautness of this chain track.

By scrutinizing Figure 8, it will be seen that member 15 may, when desired, be adjusted transversely by moving the fastening of bracket 20 relative to pivot member 27, and by moving bolt 28 to a corresponding hole in bracket 25.

Applicant's half track is novel in that it may be stored or shipped disassembled, and assembled at its final destination, where the strips and links may be conveniently assembled and placed over the driving and supplemental wheels as illustrated in Figure 1.

I will now describe in detail my novel endless half track or track chain, and manner of assembling the chains and securing them to their wheels. Strips or cleats 40 are preferably formed from sheet metal having a shape as shown in Figures 2–5; comprising a strip or cleat 40 which on their inner sides are concaved as illustrated into a shape that will generally fit the tread of tires 10 which have cleats or mutilated treads.

Figure 10:
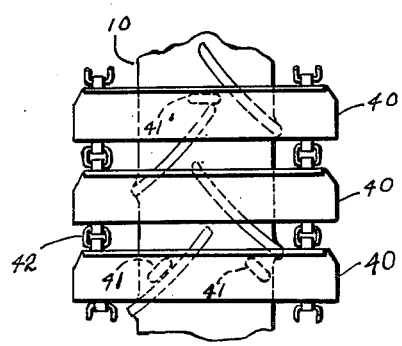
Fig. 10 is a fractional view of my improved half track illustrating a certain cleated tire and my arrangement of projections on alternate strips adapted to engage the cleats and prevent slippage.

I provide raised projections 41 and 41' on certain cleats 40 which are adapted to engage the projections or cleats on the tire treads for preventing slippage. In Figure 10, I illustrate a fractional top view of a rubber tire with cleats of a conventional design, and a pair of dotted in projections 41 on alternate strips and a single dotted in projection 41' on alternate strips, and an arrangement of projections which will satisfactorily engage the cleats on variously positioned cleats of different manufacture. Each strip 40 is provided with a flange 42 for penetrating the soil and providing traction. When traveling over very hard surfaces, flanges 42 being positioned at one side of the strips, will cause the strips to tilt. To prevent this, I provide preferably a projection 43 as illustrated.

Figure 5:
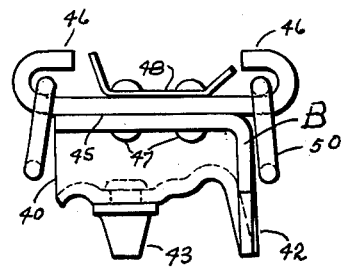
Fig. 5 is an enlarged end view of the strip and connected parts as shown in Figures 2–4.

I secure to member 40 transversely spaced apart brackets 45 with open end hooks 46—46. These hooked brackets are preferably secured to members 40 by means of rivets 47—47. These rivets also act to hold flanged brackets 48 to brackets 45 as clearly shown in Figure 5. The ends or flanges of brackets 48 are positioned originally far enough from the ends of hooks 46 so links 50 may be placed into position as shown in the figures after which these ends or flanges may be bent outwardly as shown at the right of Figure 5. Thus links 50 will then be permanently held on the hooks, for making an endless chain by means of these rectangular links 50.

It will be seen that after members 45 and 48 have been secured to the strips, links 50 may be permanently secured to the hooks for forming an endless track, or the strips and links may be stored or shipped in any convenient way and time, and place, because it is so convenient to permanently connect the links to the hooks.

Clearly the half track or chains may be assembled at the factory in straight lengths, the hooks at one end having links 50 and the hooks at the other end of the chain being open as shown at the left of Figure 5. Then all that need be done to attach the half track to the tractor wheels is to place the chain or track on the pairs of wheels and then attach the ends of the track together. Member 15 is then adjusted or the tires inflated for the proper tautness of the track.

If the track or chain is made endless before being attached, the supplemental wheels F may be moved toward the driving wheels, so the chain may be attached after which wheels F may be moved forward for adjusting the chain.

Thus it will be seen that I have evolved a novel strip or cleat, a novel endless track, novel means for connecting strips or cleats together, and novel supplemental wheel mountings, whereby the device is very desirable, because it is easily assembled, easily attached or detached, and is efficient in operation.

Having thus shown and described my invention, I claim:

In a half track attachment for tractors, the tractor having rear driving wheels supported by axles rotatably mounted in axle housings, endless tracks trained over the driving wheels, and front guiding wheels comprising in combination, brackets secured to said axle housing, other brackets hinged at their front ends to the front ends of said first brackets and parallel to said axles, said hinges comprising elongated shafts, having a number of spaced grooves, said other brackets having spaced apart U shaped bolts adapted to be positioned in two of said grooves for optional longitudinal adjustment on said shafts, forwardly extending arms secured to said other brackets and having means for longitudinal adjustment thereon, supplemental wheels carried by and rotatably mounted on the forward ends of said forwardly extending arms in engagement with the endless tracks, means for yieldingly urging said supplemental wheels downwardly and for limiting said downward movement comprising, upwardly extending bolts attached to the rear end of said other brackets and extending upwardly and freely through openings in the rear end of said first brackets, sleeves on the said bolts and positioned between the brackets for limiting the downward movement of the front ends of said arms, springs on said bolts positioned on top of said first brackets and a nut on the bolts for adjusting the tension of said springs.

References Cited in the file of this patent

UNITED STATES PATENTS

| Number | Name | Date |
|---|---|---|
| 1,268,116 | Harger | June 4, 1918 |
| 1,673,102 | Christie | June 12, 1928 |
| 1,856,068 | Christie | May 3, 1932 |
| 2,309,793 | Sedore et al. | Feb. 2, 1943 |
| 2,398,630 | Foot | Apr. 16, 1946 |
| 2,481,727 | Deffenbaugh | Sept. 13, 1949 |

FOREIGN PATENTS

| Number | Country | Date |
|---|---|---|
| 460,062 | Germany | May 19, 1928 |
| 308,837 | Great Britain | May 22, 1930 |
| 319,042 | Italy | June 27, 1934 |